Jan. 22, 1929.
L. C. MARSHALL
1,699,980
APPARATUS FOR SLITTING PISTON RINGS
Filed Feb. 9, 1926   6 Sheets-Sheet 1
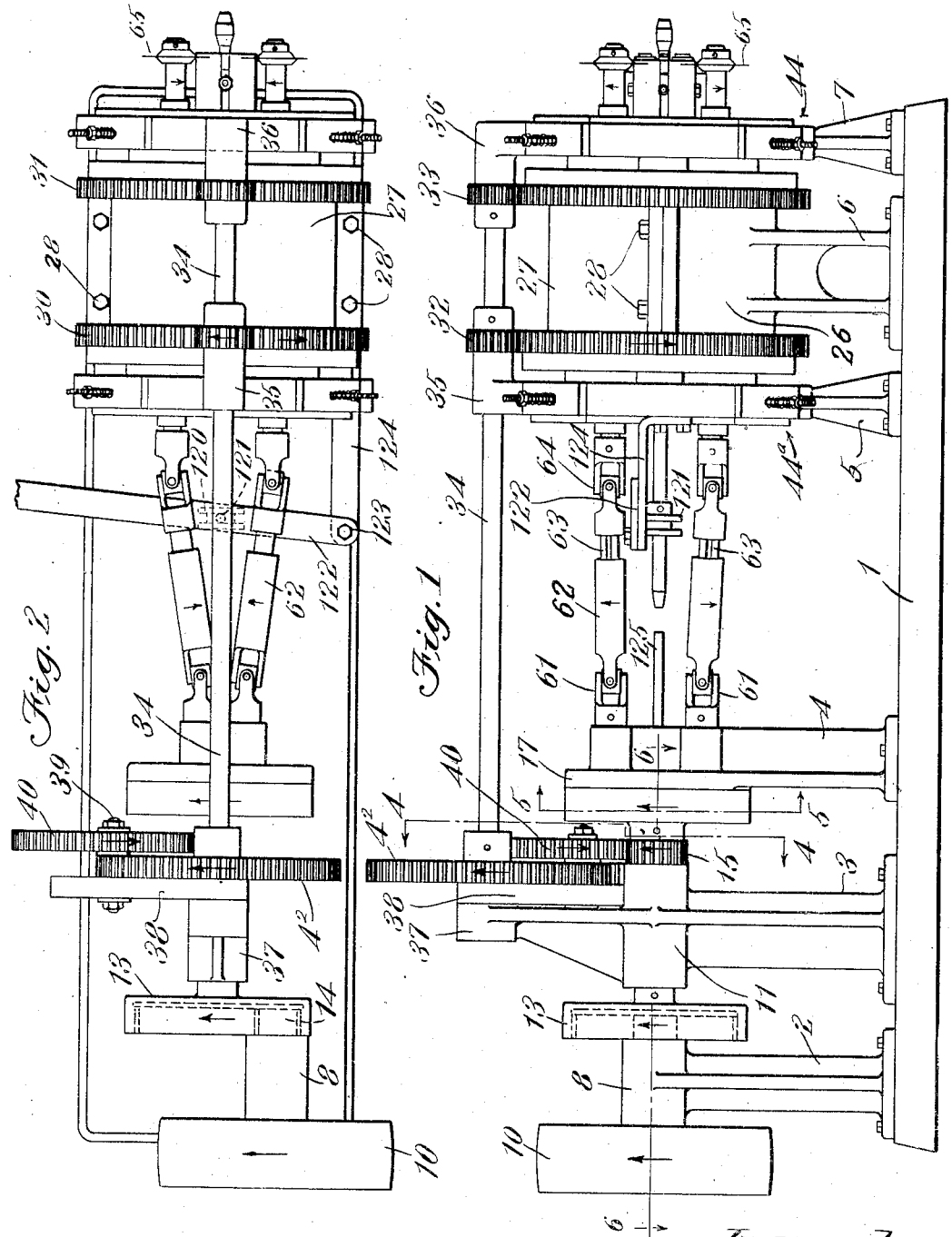
Inventor
Lewis C. Marshall
by Roberts Cushman & Woodberry
Att'ys

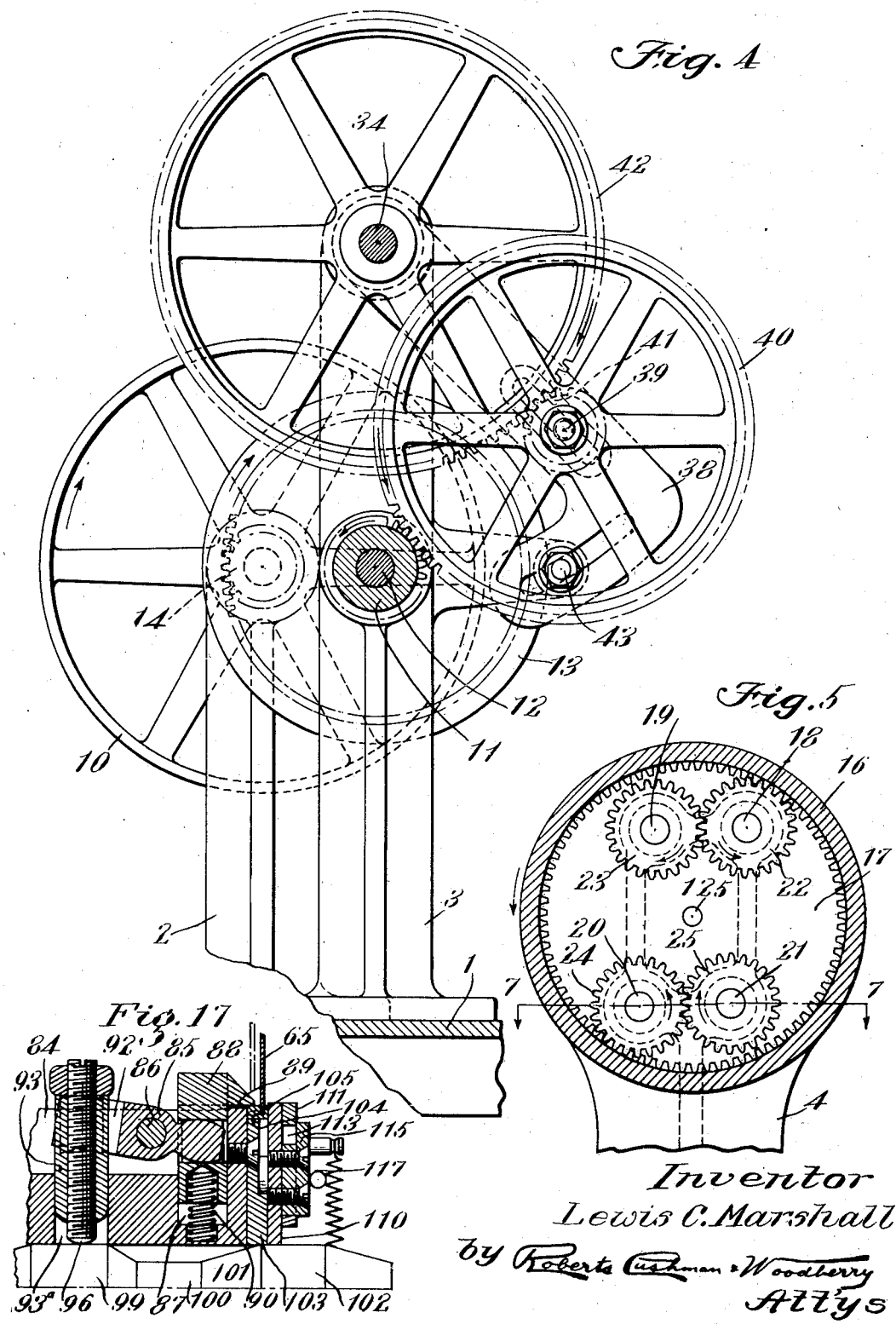

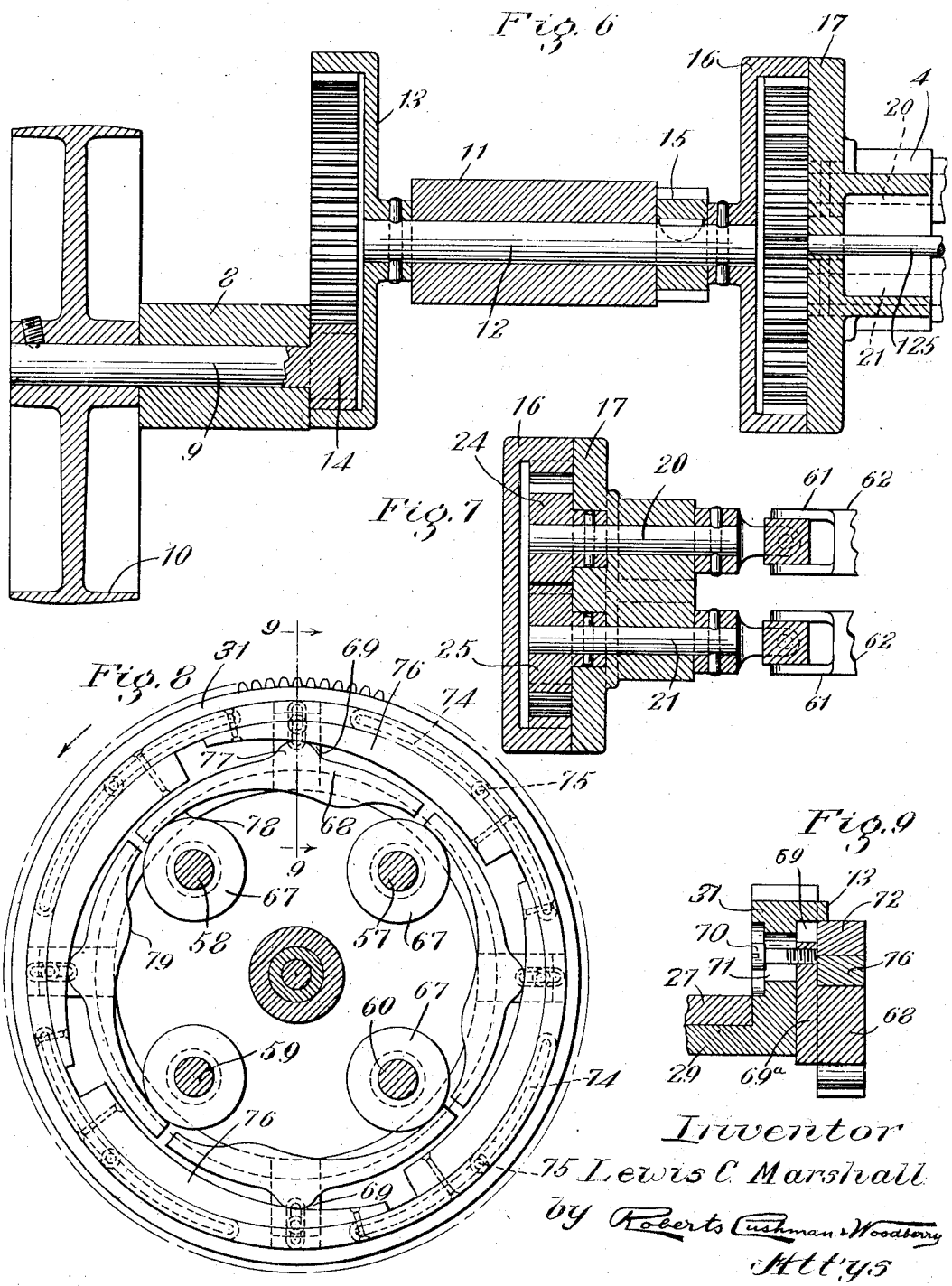

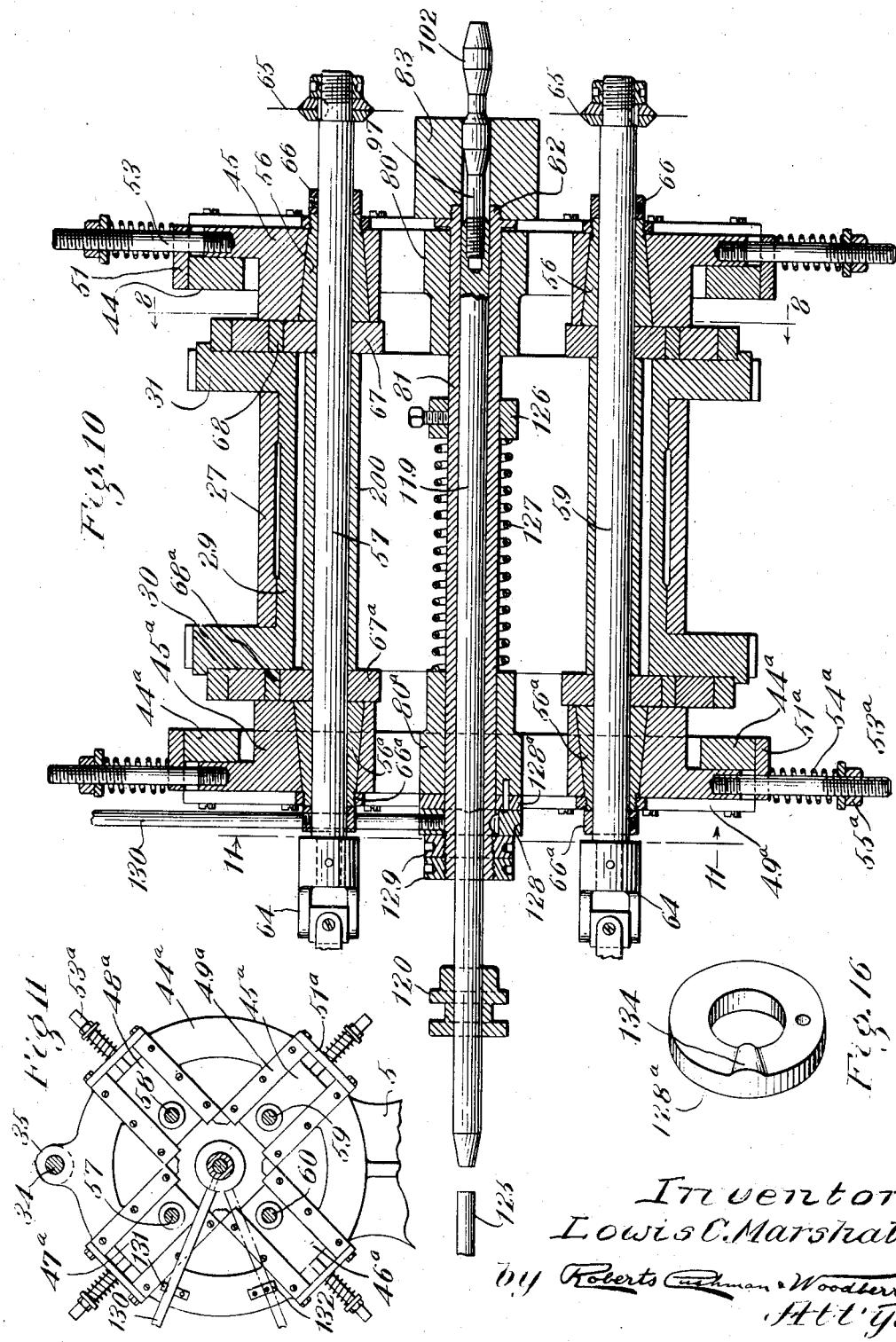

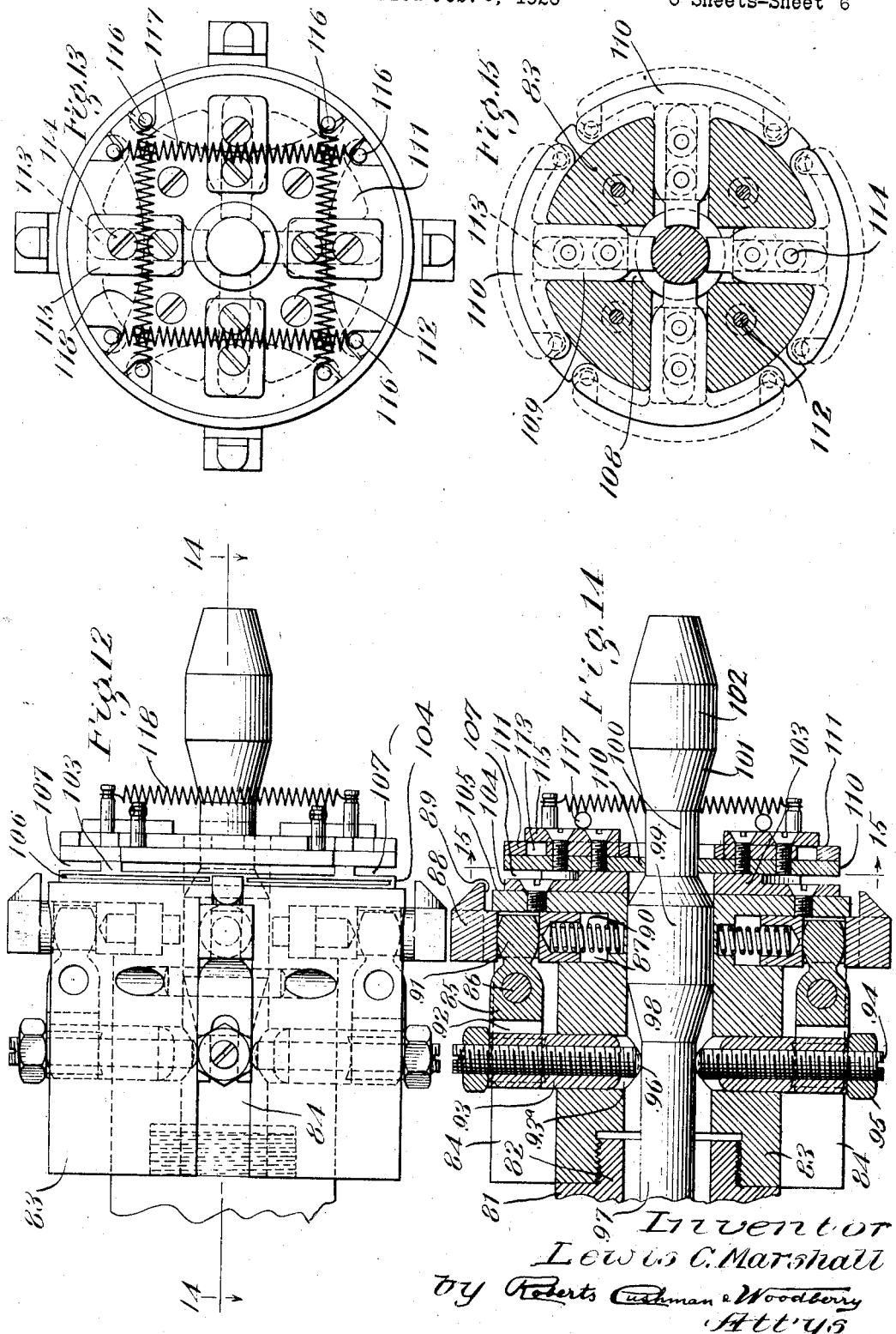

Patented Jan. 22, 1929.

1,699,980

UNITED STATES PATENT OFFICE.

LEWIS C. MARSHALL, OF WALPOLE, MASSACHUSETTS.

APPARATUS FOR SLITTING PISTON RINGS.

Application filed February 9, 1926. Serial No. 87,041.

This invention pertains to the manufacture of metallic piston rings and more particularly to the production of rings provided with circumferentially extending radial slits. Such slits are useful for various purposes, for example, for oil scraping, or as disclosed in my Patent No. 1,500,252, dated July 8, 1924, for making the ring inherently resilient in an axial direction. For the latter purpose the rings are furnished with slits usually in planes perpendicular to the axis of the ring and disposed in two or more series spaced axially of the ring, the slits in adjacent series being staggered relatively to one another. Alternatively, slits diagonal to the axis of the ring are sometimes provided, adjacent slits overlapping at their ends so as to furnish the desired resiliency.

Slits of the type referred to are commonly made by means of a rotary saw and the saw and ring are caused to approach along lines substantially radial to the center of the ring until the desired depth of cut is obtained. Usually the position of the saw axially of the ring, the duration of the cutting operation, and the regulation of the depth of cut require careful attention upon the part of the workmen and thus the operation is at best slow and expensive and usually entails a large production loss through breakage or imperfections. Obviously the greater the number of slits required, the slower and more expensive is the operation and thus while the axially resilient slitted ring is very efficient and desirable as a packing, the cost of production is excessive as compared with that of unslitted rings.

Accordingly the principal object of the present invention is to provide mechanism of more or less automatic type capable of forming radial slits in a split metallic piston ring at high speed with all requisite accuracy, with a minimum production loss, and if desired in a plurality of axially spaced series.

In the accompanying drawings a preferred embodiment of the invetion is illustrated by way of example and in such drawings:

Fig. 1 is a side elevation of a preferred mechanism embodying the present invention;

Fig. 2 is a plan view of the same mechanism, certain parts being broken away;

Fig. 4 is a vertical section to large scale substantially on the line 4—4 of Fig. 1, certain parts being broken away;

Fig. 5 is a fragmentary vertical section substantially on the line 5—5 of Fig. 1, omitting the front part of the machine;

Fig. 6 is a fragmentary horizontal section to larger scale substantially on the line 6—6 of Fig. 1;

Fig. 7 is a fragmentary horizontal section on the line 7—7 of Fig. 5;

Fig. 8 is a vertical section substantially on the line 8—8 of Fig. 10;

Fig. 9 is a fragmentary vertical section on line 9—9 of Fig. 8 but to larger scale;

Fig. 10 is a section substantially on the line 10—10 of Fig. 3;

Fig. 11 is a fragmentary vertical section to smaller scale on line 11—11 of Fig. 10;

Fig. 12 is a fragmentary plan view, to larger scale, of the ring support and coöperating clutch elements;

Fig. 13 is a front view of the parts shown in Fig. 12;

Fig. 14 is a vertical section substantially on the line 14—14 of Fig. 12;

Fig. 15 is a vertical section substantially on the line 15—15 of Fig. 14;

Fig. 16 is a detail view illustrating a ring shifting cam forming an element of the mechanism, and Fig. 17 is a fragmentary section similar to Fig. 14 showing the clamping jaws in operative position.

Figure 3:
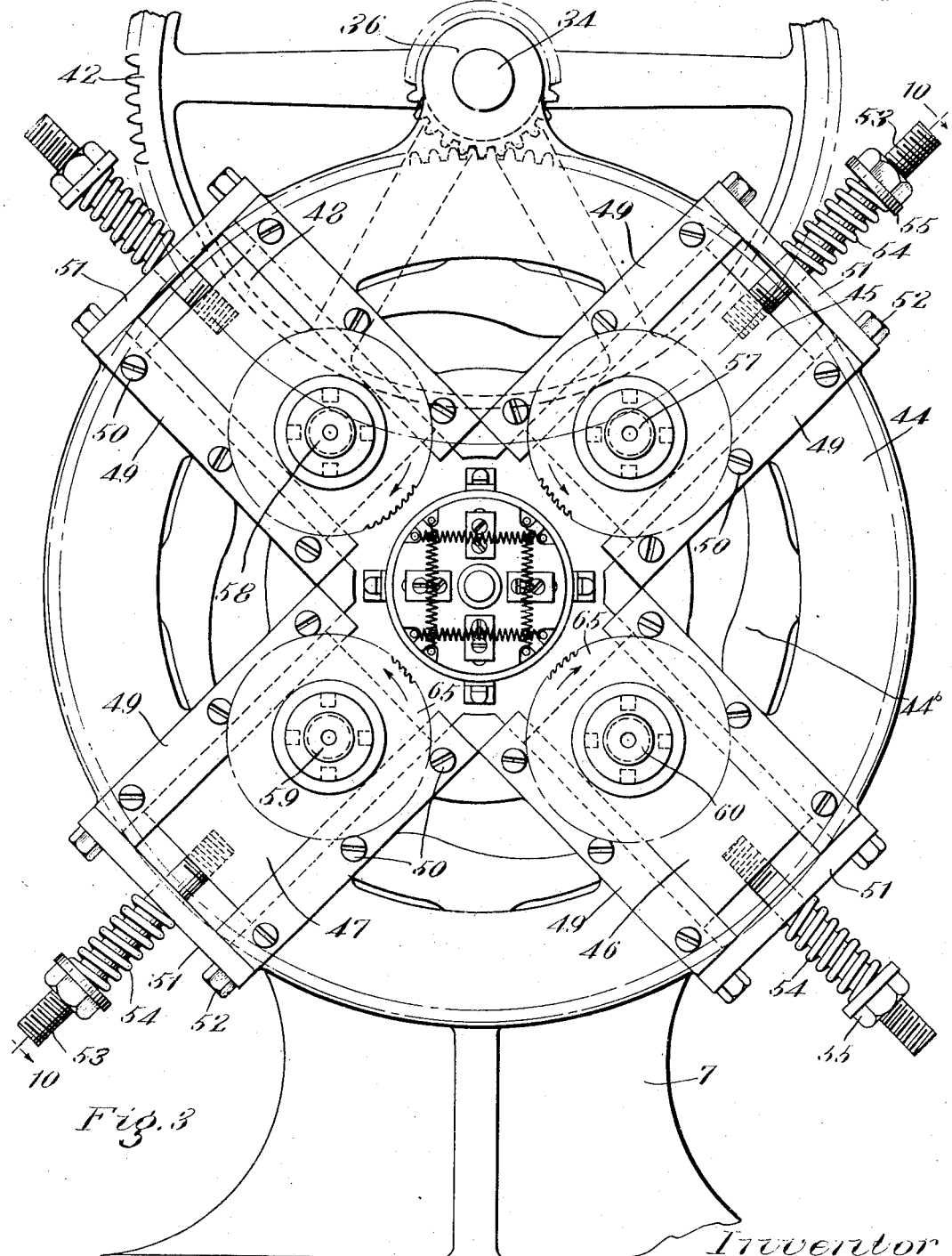
Fig. 3 is a fragmentary front elevation of the mechanism shown in Fig. 1, viewed from the right hand side of the latter figure and to larger scale.

Referring more particularly to the drawings, the numeral 1 designates a base or support which carries the operative mechanism. This base is provided with a plurality of uprights 2, 3, 4, 5, 6 and 7 which support the bearings for the various moving parts. As here shown these uprights are independent of the base 1 and attached thereto by means of bolts but it is to be understood that the uprights may be made integral with the base if desired.

Referring more particularly to Figs. 1 to 7, the upright 2 supports a bearing 8 for a main drive shaft 9 provided at its rear end with a driving pulley 10 adapted to receive a belt driven from any suitable source of power. The upright 3 is provided with a bearing 11 which is offset laterally with respect to the bearings 8 and supports a shaft 12 which is provided at its rear end with an internal gear 13 which meshes with a pinion 14 upon the forward end of the shaft 9. The shaft 12 is furnished just forward of the bearing 11 with a pinion 15 and at its forward end with an internal gear 16.

The support 4 comprises a plate 17 which forms a cover for the front face of the internal gear 16 and this plate 17 is provided with openings for the passage of four shafts 18, 19, 20 and 21 respectively which turn in suitable bearings in the upper part of the upright 4. The shafts 18, 19, 20 and 21 are parallel to each other and disposed in pairs, the shafts 18 and 19 being adjacent to the upper part of the gear 16, and the shafts 20 and 21 being adjacent to the lower part of said gear. The shaft 18 is furnished with a pinion 22 (Fig. 5) which engages the internal gear 16 and which also engages a pinion 23 mounted on the shaft 19. The pinion 23 does not engage the gear 16.

The shaft 20 is furnished with a pinion 24 which meshes with the gear 16 and also with the pinion 25 on the shaft 21. The latter pinion does not mesh with the gear 16. As thus arranged the gears 22 and 23 turn in opposite directions as indicated by the arrows in Fig. 5, while the gears 24 and 25 also turn in opposite directions. Likewise the pinion 23 turns oppositely to the pinion 24 and the pinion 22 turns oppositely to the pinion 25.

Referring now to Figs. 1, 2 and 10, the support 6 carries a bearing consisting of the seat member 26 and the removable cap 27, these parts being connected by bolts 28. This bearing supports a cam-carrying drum 29 (Fig. 10) which has radial flanges 30 and 31 respectively at its opposite ends. These flanges are furnished with gear teeth on their peripheral edges which mesh with pinions 32 and 33 respectively mounted on a shaft 34. This shaft turns in bearings 35 and 36 carried by the uprights 5 and 7 respectively and at their rear end in a bearing 37 carried by the upright 3.

A bracket 38 (Figs. 1, 2 and 4) is mounted to swing upon the shaft 34 adjacent to the bearing 37 and this bracket is provided with a slot in which a stub shaft 39 is adjustably secured. Upon this stub shaft is mounted a compound gear comprising the large gear 40 and a small pinion 41 meshing respectively with the pinion 15 on the shaft 12 and a large gear 42 secured to the shaft 34. The bracket 38 is held in proper position by means of a bolt 43 engaging an arcuate slot in the bracket. This arrangement permits the exchange of the compound gear for another of different pitch diameter so that the speed of the driven parts may if desired be varied.

The supports 7 and 5 carry fixed disk-like spider members 44 and 44ª (Figs. 3, 10 and 11), respectively which are concentric with the axis of the cam drum 29 and disposed at opposite ends of the latter. These spiders are preferably cut away to provide openings 44ᵇ for the sake of economy in material although this is not necessary. Each of the spiders 44 and 44ª is furnished with a plurality of radial slots forming guideways for bearing supporting blocks. As here shown each spider is furnished with four such guideways disposed at 90° apart and extending radially from the center of the spider. For convenience and as here illustrated these guideways are inclined at an angle of 45° to the vertical but the exact angular disposition of the guideways is immaterial.

The guideways of the spider 44 receive sliding bearing blocks 45, 46, 47 and 48 (Fig. 3) respectively and the guideways of the spider 44ª receive similar blocks 45ª 46ª, etc. In order to retain the blocks 45, etc., within their guideways, cover plates 49 are arranged to overlap the front faces of the blocks, such cover plates being retained in position by screws 50. The blocks 45, etc., are likewise prevented from escaping endwise from their guideways by means of cover plates attached to the spider by bolts 52.

Each of the sliding block 45, etc., is furnished with an outwardly projecting rod 53 which passes freely through an opening in the corresponding cover plate 51 and which is encircled by a coiled spring 54 which bears at one end against the outer surface of the cover plate and at its opposite end against a nut 55 having threaded engagement with the rod 53. The nuts 55 tension the springs 54 and the latter tend to move their corresponding bearing blocks outwardly along the guideways. The bearing blocks 45ª, etc., are similarly retained in position by the plates 49ª and 51ª and are furnished with projecting rods 53ª encircled by the coil springs 54ª which are tensioned by nuts 55ª.

Each of the bearing blocks 45, 46, etc., of the spider 44 is furnished with a bearing 56 and the corresponding bearing blocks 45ª etc. of the spider 44ª are furnished with bearings 56ª. Corresponding bearings of the front and rear spiders are aligned with each other and these pairs of aligned bearings carry saw shafts 57, 58, 59 and 60 respectively, such shafts projecting at opposite ends from their bearings.

Referring more particularly to Figs. 1, 2, 5 and 7, the shafts 18, 19, 20 and 21 are connected by means of universal joints 61 to hollow shafts 62 into which telescope corresponding shafts 63 which are splined to the hollow shafts 62. The shafts 63 in turn are connected by universal joints 64 to the rearwardly extending ends of the saw shafts 57, 58, 59 and 60 respectively. The forwardly extending ends of the saw shafts are adapted to support circular saws 65 which are removably secured to the shafts in any desired manner and all of which preferably lie in substantially the same plane. The saw shafts are held in proper position in their bearings by means of collars 66 (Fig. 10) near their forward ends and collars 66ª near their rear ends.

Each of the saw shafts is provided at points adjacent to the inner ends of its bearings 56 and 56ª with cam follower rolls 67 and 67ª respectively which may be held in proper spaced relation by means of a sleeve 200. The cam following roll 67 of each of the saw shafts is adapted to be engaged by an actuating cam 68, the several cams 68 being of like contour and construction. Similarly the cam follower rolls 67ª of the saw shafts are adapted to be engaged by actuating cams 68ª, such cams being of like contour and construction and similar to the corresponding cams 68.

Since the several cams 68 and 68ª are of substantially identical construction, it is sufficient to describe but one of these cams and its actuating means in detail and for this purpose reference may be had to Figs. 8 and 9. In the latter figures the flange 31 of the cam carrying drum 29 is shown as provided upon its front face with a slot 69 for the reception of a guide rib 69ª projecting from the rear face of the cam 68. The guideway is substantially radial so that the cam is guided for radial movement. The cam is retained in position within its guide slot by means of a bolt 70 passing through a narrow radial slot 71 in the flange 31 and which has threaded engagement with the guide member 69ª.

An adjusting ring 72 embraces the cams 68 and bears at its outer edge against a retaining flange 73 projecting from the part 31. This ring 72 is provided with circumferential slots 74 (Fig. 8) for the reception of securing bolts 75 projecting through the flange 31. By loosening these bolts 75 the ring 72 may be moved angularly with respect to the flange 31.

The ring 72 supports four wedge like cam segments 76 which are adapted respectively to bear upon lugs 77 upon the several cams 68. The arrangement just described permits simultaneous radial movement of the several cams 68 by rotation of the ring 72 to compensate for wear of the same or in working on rings of different thickness or diameter. Normally, however, the cams 68 are fixed relatively to the cam carrier drum 29.

Since the cams and the adjusting means therefor, which engage the cam follower rolls 67ª at the rear end of the drum, are like those just described, it is unnecessary to describe them in detail, it being sufficient to say that the cams at the front and rear ends of the drum are so set as to keep the several saw shafts always in substantial parallelism.

With the arrangemnt thus far described the saw shafts are urged radially outward along their guideways by the springs 54 and are caused simultaneously to move inwardly toward the axis of the cam drum, while maintaining their parallelism, by the slow rotation of the drum which causes the cam follower rolls, which normally engage the low parts 78 of their respective cams, gradually to ride up onto the high parts 79 of their cams so that the saw shafts are forced inwardly. As the drum continues to revolve the cams progress and the saw shafts are permitted by the low parts of the cams to move outwardly to their original position.

The spiders 44 and 44ª are furnished with central bearing members 80 and 80ª (Fig. 10) respectively for a tubular shaft or sleeve 81. This shaft projects beyond the forward bearing 80 and is furnished with a screw-threaded end 82 (Figs. 10 and 14) for the reception of a ring supporting sleeve or head 83. This ring supporting head is preferably of substantially cylindrical form having an axial bore and is provided with slots 84 of which four are here shown, although a greater or lesser number may be provided according to the number of clamping jaws to be used. These slots are substantially 90° apart and extend longitudinally of the head. In each of the slots 84, a lever 85 is arranged which is adapted to swing in a radial plane. At the forward end of each slot 84 a radial guide bore 87 is provided which is adapted to receive the stem 88 of a ring clamping jaw 89. A spring 90 is set in the bottom of the bore 87 and tends to move the stem 88 with its jaw 89 outwardly.

The forward end of each lever 85 is furnished with a head 91 which works in a slot in the stem 88 of the corresponding jaw. The rear or tail portion of the lever 85 is furnished with a narrow radial slot for the reception of the laterally flattened upper portion of a sleeve 93. This sleeve is internally screw threaded and receives a cam-follower screw 96 which is locked in adjusted position by means of a nut 95.

The inner end of the sleeve 93 passes through a radial bore in the wall of the head 83 and the cam follower screw 94 extends inwardly into the axial bore of the head and is adapted to bear against the surface of a clamp actuating spindle 97. This spindle is furnished with a conical cam portion 98 leading up to a substantially cylindrical locking portion 99 of a diameter substantially greater than the body of the spindle. Forwardly of the part 99 the spindle resumes its normal diameter as indicated at 100 and this portion is followed by a second conical cam 101 merging into a cylindrical locking portion 102 of substantially the same diameter as the portion 99. The bore in the head 83 is of such diameter that the parts 99 and 102 of the spindle may have a free sliding fit therein.

An interchangeable disk-like ring support or arbor 103 is removably secured by means of screws or otherwise to the front face of the head 83. This member 103 has a ring engaging seat 104 of a diameter to fit snugly within the ring to be operated upon, the seat 104 being spaced inwardly of the edge of the head 83 to provide an abutment shoulder 105 against which one radial face of the ring may rest as shown in Fig. 17. Slits 106 disposed in a plane perpendicular to the axis of the arbor are provided in the seat surface 104, such slits being adapted to receive the edges of the saws 65 as the latter cut through into the interior of the ring. The member 103 is also furnished with a second series of slits 107 disposed in a plane parallel to but spaced from the plane of slits 106 for receiving the edges of the saws in cutting a second series of slits in the ring.

The forward face of the member 103 is furnished with four radial slots or guideways 108 (see Fig. 15) disposed substantially 90° apart and preferably substantially in the radial planes of movement of the stems 88 of the several jaws 89. These guideways receive the stem portions 109 of ring retaining jaws 110. The jaws 110 are of arcuate form and collectively adapted to engage the larger portion of the outer radial face of the ring while the latter is being cut, thereby to confine the ring between such jaws and the shoulder 105 and positively to prevent it from moving axially.

The several jaws 110 with their stems 109 are retained in their guiding slots by means of a ring 111 which is secured to the forward face of the member 103 by screws 112 and which is provided with radial slots 113 for the reception of screws 114 passing through sliding retainer plates 115 at the outer side of the ring 113 and which have threaded engagement with the stems 109 of the several retaining jaws.

Each of the jaws 110 is provided adjacent to its opposite ends with outwardly projecting posts 116 and the corresponding posts of opposite pairs of jaws are connected by coiled springs 117 and 118 respectively, such springs tending to move the jaws radially inward. The inner ends of the stems 109 normally bear against the part 100 of the arbor 97 which limits their inward movement.

The spindle 97 is removably connected (Fig. 10) as by means of screw threads to the forward end of an adjusting bar 119 which is adapted to slide axially within the sleeve 81. This bar 119 projects from the rear end of the sleeve 81 and is furnished with a circumferentially grooved collar 120 fixed thereto. A hand lever 122 (Figs. 1 and 2) is fulcrumed at 123 upon a bracket 124 carried by the spider 44ª and is provided with a pin 121 which engages the groove in the collar 120. By manipulation of the handle 122 the bar 119 and the spindle 97 may be moved axially with respect to the cam drum and the parts carried thereby. In order to limit the movement of the bar 119, a stop member 125 (Figs. 1 and 6) is secured to the plate 17 and extends forwardly from the latter in line with the bar 119.

A collar 126 is secured to the sleeve 81 intermediate the bearings 80 and 80ª and a coiled spring 127 bears at one end against this collar and at the other against the bearing 80ª. This spring tends to move the sleeve 81 forwardly in its bearings and thus to move the head 83 with the ring support forwardly. This movement of the sleeve is limited by means of a collar 128 secured to the rear end of the sleeve and engaging an interchangeable cam plate 128ª (Figs. 10 and 16) removably pinned to the rear face of the bearing 80ª. The collar 128 is retained in position upon the sleeve by means of lock nuts 129. A handle 130 is secured to the collar 128 and projects radially therefrom. This handle is adapted to swing to the extent permitted by stops 131 and 132 (Fig. 11) secured to the rear face of the spider 44ª. The collar 128 is furnished with a cam recess normally receiving a complemental cam riser 134 upon the cam member 128ª, these cam elements being so arranged that by movement of the handle from one stop member to the other, the recess is disengaged from the riser causing the riser to ride up onto the face of the collar 128, thus producing a predetermined axial movement of the sleeve 81 simultaneous with its partial rotation.

... The operation of the mechanism is substantially as follows, it being assumed that the parts are normally in the position shown in the drawings. The operator first places a ring upon the ring support 104 and then manipulates the handles 122 to draw the spindle 97 rearwardly. As the spindle moves rearwardly the cam surface 98 engages the cam follower screws 96 and pushes the latter outwardly, thus swinging the levers 85 and forcing the jaws 89 inwardly until they bear upon the circumferential surface of the ring. The follower screws 96 are so adjusted with reference to the thickness of the particular ring to be operated upon that the jaws come into holding engagement with the ring surface substantially at the instant that the follower screws 96 ride up onto the cylindrical surface 99 of the spindle so that the jaws are positively locked in this position.

As the operator continues to move the handle 122 the surface 99 moves along under the screws 96 without further changing their position and eventually the surface 101 rides beneath the ends of the tail pieces 109 of the retaining jaws 110, thus forcing such jaws outwardly in opposition to their springs 117 and 118 and causing them to overlie the outer radial surface of the ring, thus preventing the ring from moving outwardly in an axial direction. Since the jaws 110 are readily removable and replaceable, they may be made of proper thickness to cooperate with any size of ring which is being cut and in this way a positive retention of the ring is secured which insures accuracy of work.

The ring having been placed in position, the machine is started and as the cam drum 29 begins to rotate the cams 68 engage the follower rolls carried by the saw shafts and gradually force the shafts radially inwardly, the driving connections above described being such that the saws may be rotated in all positions of bodily adjustment of the shafts.

The saws 65 are thus gradually brought into contact with the circumferential surface of the ring at points spaced substantially 90° apart about the ring and as the cam drum continues slowly to revolve the saws are fed radially inward to the extent determined by the riser portions 79 of the several cams. Since the cams are all alike the saw cuts are of equal depth.

During the formation of this first cut the saws work in the plane of the slots 107 in the ring supporting member and these slots receive the edges of the saws as the latter break through into the interior of the ring. After the saws have been forced inwardly to the predetermined extent, the further rotation of cam drum permits the saw shafts to move outwardly under the action of the retracting springs 54, and after the saws have been disengaged from the ring, the operator swings the handle 130 to give the sleeve 81 a one-eighth turn. This moves the sleeve 81 forwardly to the extent determined by the cam element 134, this being the distance which is to separate the two series of slits to be formed in the ring. As the cam drum continues to rotate, the cams 68 again engage the cam follower rolls upon the saw shafts and again force the saw shafts inwardly to produce a second series of slits. At this time the saws are in the plane of the slots 106 in the ring support, such slots receiving the saws as the latter break through into the interior of the ring.

When this second series of slots has been completed, the saws are again permitted to withdraw and the operator may stop the machine, releasing the ring by manipulation of the handle 122. Another ring may now be slipped upon the ring support and the handle 122 moved to clamp the ring in position. The machine may now again be started and the saws will form the first series of slits with the parts as thus disposed. After this first series of slits has been completed the operator moves the handle 130 to retract the ring supporting head, whereupon the second series of slits will be formed.

The machine is thus of semi-automatic character and adapted with great precision to form the desired slits in the ring. By carrying forward in an obvious manner certain of the features herein disclosed, rings having a greater number of slits or series of slits may be produced.

While certain desirable arrangements of parts have been herein disclosed as suitable for producing the proper relative motions of the operative instrumentalities, it is to be understood that such arrangements are to be considered as illustrative of any suitable assemblage of mechanical devices adapted to produce the desired results. Furthermore, while rotary saws have been disclosed as the means for producing the desired slits in the rings, it is contemplated that other instrumentalities might possibly be found suitable for the purpose and under such circumstances such equivalent instrumentalities might well be substituted for the saws here disclosed and moved inwardly simultaneously for producing the slits in the ring.

I claim:

1. Apparatus of the class described comprising a plurality of pairs of parallel normally fixed guideways, the several pairs of guideways radiating from a common axis, aligned bearings in each pair of guideways, a saw shaft journalled in each pair of bearings, a drive shaft, a gear mounted thereon, a plurality of pinions corresponding in number to the saw shafts, said pinions meshing with said gear, an extensible and flexible shaft connecting each pinion to a corresponding saw shaft, and means for moving the bearings of each saw shaft along their guideways.

2. Apparatus of the class described comprising a pair of spaced frame members disposed in parallel planes, a set of guideways carried by each frame, corresponding guideways of the two sets being parallel and supporting a pair of aligned slidable bearings, a saw shaft journalled in each pair of aligned bearings, the several shafts being parallel, a cam drum journalled in a fixed bearing between the frames, said drum enclosing the several saw shafts, a cam mounted upon the interior of the drum adjacent to each of its ends, a cam follower member carried by each shaft in the plane of rotation of each of said cams, means for turning all of the saw shafts, and means for turning the cam drum at a speed slower than that of the saw shafts.

3. Apparatus of the class described comprising a ring support, a plurality of parallel saw shafts spaced symmetrically about the support, a cam drum enclosing the saw shafts, a pair of axially spaced cams corresponding to each saw shaft, said cams being carried by the drum and adapted to move the shafts radially inward as the drum rotates, means for simultaneously driving the shafts, and means for turning the cam drum at a relatively slow speed.

4. Apparatus of the class described comprising a ring support, a plurality of parallel saw shafts spaced symmetrically about the support, a cam drum enclosing the saw shafts, a pair of axially spaced cams corresponding to each saw shaft, said cams being carried by the drum and adapted to move the shafts radially inward as the drum rotates, springs tending to move the shafts radially outwardly in opposition to the cams, means for driving all of the saw shafts, and means for slowly turning the cam drum.

5. Apparatus of the class described comprising a ring support, a plurality of saw shafts spaced about the axis of a ring mounted on the support, a saw on each shaft, means for driving the shafts, means for simultaneously moving the shafts bodily toward the axis of the ring to cause the saws to form slits in the ring, and cam means for moving the support axially of the ring.

6. Apparatus of the class described comprising a ring support, a plurality of saw shafts spaced about the axis of a ring mounted on the support, a saw on each shaft, means for driving the shafts, means for simultaneously moving the shafts bodily toward the axis of the ring to cause the saws to form slits in the ring, a spring tending to move the support in a predetermined direction, means limiting such movement, and a cam for moving the support a predetermined distance in the other direction.

7. Apparatus of the class described comprising bearing means, a shaft arranged to turn and to slide in said bearings, a ring support carried by the shaft, a spring tending to move the shaft in one direction, stop means limiting such movement, means for turning the shaft, a cam element carried by the shaft and engageable with a relatively fixed part for moving the shaft in the other direction, and a plurality of saws for slitting a ring mounted upon the support.

8. Apparatus of the class described comprising aligned fixed bearings, a shaft arranged to turn and to slide in said bearings, a ring support carried by the shaft, means for turning the shaft, cam means operable as the shaft is turned to cause it to move axially, and a plurality of saws for slitting a ring mounted on the support.

9. Apparatus of the class described comprising aligned fixed bearings, a shaft arranged to turn and to slide in said bearings, a ring support carried by the shaft, a handle for turning the shaft, stop means for limiting such turning, cooperable cam elements for moving the shaft a predetermined distance in an axial direction as it is turned, and a plurality of saws adapted to form slits in a ring mounted upon the ring support in either position of adjustment of the sleeve.

10. Apparatus of the class described comprising a shaft, a ring support mounted thereon, said support comprising an annular head provided with a plurality of radial guides, jaws sliding in said guides, an arbor concentric with said jaws for the reception of a ring, a spindle movable axially of the head, a cam carried by the spindle for simultaneously adjusting the several jaws, and a plurality of saws movable toward the arbor for slitting a ring mounted thereon.

11. Apparatus of the class described comprising a shaft, a ring support mounted thereon, said support comprising an annular head provided with a plurality of radial guides, jaws sliding in said guides, an arbor concentric with said jaws for the reception of a ring, a lever connected to each jaw, a radially directed cam follower connected to each lever, a spindle movable axially of the annular head, a conical cam carried by the spindle and engageable with the several cam followers for moving the jaws to ring clamping position, springs tending to move the jaws in the other direction and a plurality of saws for slitting a ring mounted on the arbor.

12. Apparatus of the class described comprising a shaft, a ring support mounted thereon, said support comprising an annular head provided with axially spaced sets of radial guides and a ring receiving arbor between said sets of guides, jaws disposed in one set of guides for engagement with the peripheral surface of a ring mounted on the arbor, jaws disposed in the other guides for engagement with a radial face of the ring, a spindle movable axially of the head, and cam elements carried by the spindle for actuating the jaws of the respective sets.

13. Apparatus of the class described comprising a shaft, a ring support mounted thereon, said support comprising an annular head provided with axially spaced sets of radial guides, and a ring receiving arbor between said sets of guides, jaws disposed in one set of guides for engagement with the peripheral surface of a ring mounted on the arbor, jaws disposed in the other guides for engagement with a radial face of the ring, a spindle movable axially of the head, a pair of conical cam elements secured in axially spaced relation on the spindle and operable respectively to move the jaws of the two sets into operative position, means for moving the spindle, and saws for slitting a ring mounted upon the arbor.

14. Apparatus of the class described comprising a shaft, a ring support mounted thereon, said support comprising an annular head provided with axially spaced sets of radial guides and a ring receiving arbor between said sets of guides, jaws disposed in one set of guides for engagement with the peripheral surface of a ring mounted on the arbor, jaws disposed in the other guides for engagement with a radial face of the ring, a spindle movable axially of the head, and cam means carried by the spindle for moving the jaws of the respective sets into operative position, springs tending to move the jaws in the opposite direction, means for moving the spindle axially, and a stop for limiting movement of the spindle.

Signed by me at Boston, Massachusetts, this sixth day of February, 1926.

LEWIS C. MARSHALL.